United States Patent [19]

Nakamura et al.

[11] Patent Number: 5,019,319

[45] Date of Patent: May 28, 1991

[54] GOLF BALL

[75] Inventors: Makoto Nakamura, Fujimi; Toshio Honda; Toshio Chikaraishi, both of Akishima; Yukio Fukuura, Sayama, all of Japan

[73] Assignee: Bridgestone Corporation, Tokyo, Japan

[21] Appl. No.: 490,240

[22] Filed: Mar. 8, 1990

[30] Foreign Application Priority Data

Mar. 8, 1989 [JP] Japan .................................. 1-55933

[51] Int. Cl.$^5$ .................... A63B 37/02; A63B 37/06; A63B 37/00
[52] U.S. Cl. .................................... 273/218; 273/220; 273/230; 260/998.14; 524/908
[58] Field of Search ................................ 524/533, 908; 260/998.14; 273/218, 220, 228, 230

[56] References Cited

U.S. PATENT DOCUMENTS

| | | | |
|---|---|---|---|
| 4,165,877 | 8/1979 | Miller et al. | 273/218 |
| 4,266,772 | 5/1981 | Martin et al. | 273/218 |
| 4,715,607 | 12/1987 | Llort et al. | 273/218 |

OTHER PUBLICATIONS

Abstract of Japanese Patent 58-087140, 5/83.

*Primary Examiner*—Allan M. Lieberman
*Attorney, Agent, or Firm*—Sughrue, Mion, Zinn, Macpeak & Seas

[57] ABSTRACT

A one-piece golf ball or a core of a multi-layered golf ball is formed from a rubber composition containing a base rubber component in the form of a modified rubber which is prepared by introducing an unsaturated carboxylate group into a polybutadiene rubber. The ball is satisfactorily durable and shows good flying performance.

6 Claims, 2 Drawing Sheets

GOLF BALL

This invention relates to golf balls, and more particularly to golf balls having a high hardness and improved impact resistance and durability.

BACKGROUND OF THE INVENTION

Golf balls are generally classified into one-piece golf balls and multi-layered golf balls. The multi-layered golf balls include two-piece balls having a core coated with a resinous cover, three-piece balls having a core coated with a resinous cover through one or more intermediate layers, and thread-wound balls having a core wound with rubber thread and coated with a resinous cover. In the prior art, these one-piece golf balls and cores of multi-layered golf balls were prepared by molding a rubber composition comprising a rubber component (base rubber) such as polybutadiene, a co-crosslinking agent such as an unsaturated carboxylic acid metal salt, a filler such as zinc oxide, and a free radical releasing agent (co-crosslinking initiator) such as dicumyl peroxide while applying heat and pressure. These golf balls are known to show good flying performance as described in Japanese Patent Publication No. 19615/1980.

Although good flying performance is achieved with the use of the above-mentioned rubber composition, there is a room for further improvement with respect to the durability of one-piece golf balls and cores of multi-layered golf balls. Particularly in the case of one-piece golf balls having no cover thereon, the balls themselves have to be hard. Hardness can be increased by increasing the amount of an unsaturated carboxylic acid metal salt as the co-crosslinking agent in the rubber composition, but at the sacrifice of strength. Due to their insufficient impact resistance and durability, the balls are prone to cracking and crazing.

SUMMARY OF THE INVENTION

Therefore, an object of the present invention is to provide a novel and impoved golf ball having improved impact resistance and durability while maintaining excellent flying performance.

The inventors have found that when a modified rubber which is prepared by introducing an unsaturated carboxylate group into a diene rubber is used as a base rubber component for a rubber composition from which a one-piece golf ball or a core of a multi-layered golf ball is formed, the hardness, impact resistance, and durability of the ball can be enhanced without increasing the amount of an unsaturated carboxylic acid metal salt or similar co-crosslinking agent.

According to the present invention, there is provided a golf ball comprising a rubber composition containing a base rubber component in the form of a modified rubber which is prepared by introducing a group having the formula:

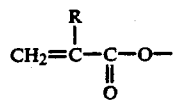
(1)

wherein R is hydrogen or an alkyl radical having 1 to 5 carbon atoms into a diene rubber. Where the ball is a one-piece golf ball, it is formed from the rubber composition. Where the ball is a multi-layered golf ball having a core coated with a cover material with or without an intermediate layer, the core is formed from the rubber composition.

DETAILED DESCRIPTION OF THE INVENTION

Figure 1:
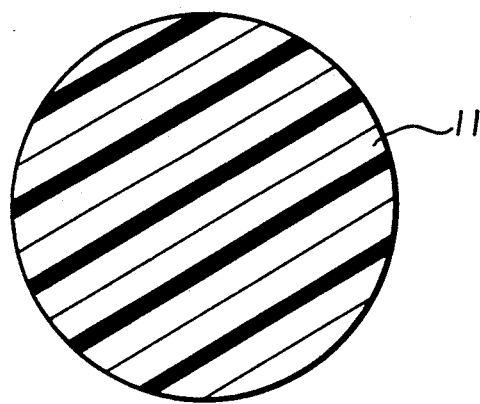
FIG. 1 is a cross section of a one-piece golf ball.
Figure 2:
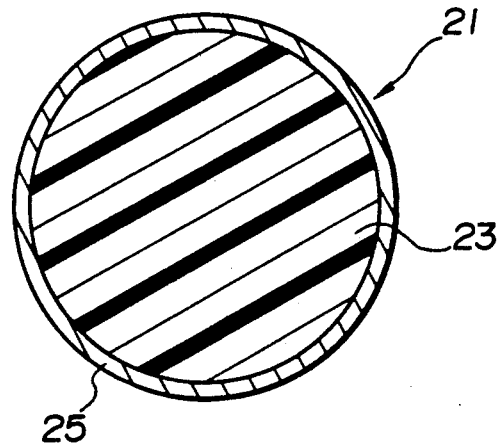
FIG. 2 is a cross section of a two-piece golf ball.

FIG. 1 shows in cross section a one-piece golf ball 11. FIG. 2 shows a two-piece golf ball 21 comprising a core 23 coated with a cover 25. A plurality of, usually 200 to 600, dimples are formed on the surface of the golf balls, although they are not shown in FIGS. 1 and 2.

According to the present invention, a one-piece golf ball or a core of a multi-layered golf ball such as a two-piece golf ball is formed from a rubber composition containing a base rubber component in the form of a modified rubber which is prepared by introducing a group having the formula:

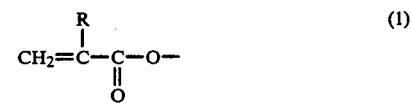
(1)

wherein R is hydrogen or an alkyl radical having 1 to 5 carbon atoms into a diene rubber.

The diene rubber used herein may be selected from those diene rubbers commonly used for conventional one-piece golf balls and cores of conventional multi-layered golf balls, especially polybutadiene rubbers containing at least 40 mol %, preferably 80 to 100 mol % of cis-1,4 bond as well as natural rubber and polyisoprene rubber. The modified rubber is prepared by introducing a group of formula (1) into any of these diene rubbers. The modified rubber may be prepared by any desired modification methods, for example, the method described in Japanese Patent Publication No. 6198/1978 or U.S. Pat. No. 4,591,618 which is incorporated herein by reference. In one preferred modification method, (a) a diene rubber (butadiene rubber in the illustrated scheme) is reacted with (b) a tertiary butyl hypochlorite and (d) an unsaturated carboxylic acid of the formula:

CH₂=CX—COOH wherein X is hydrogen or an alkyl radical having 1 to 5 carbon atoms, according to the following reaction scheme (2):

(2)

~CH₂—CH=CH—CH₂~ + (CH₃)₃COCl +
(a)                  (b)

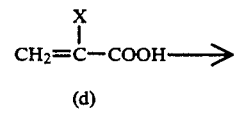

(d)

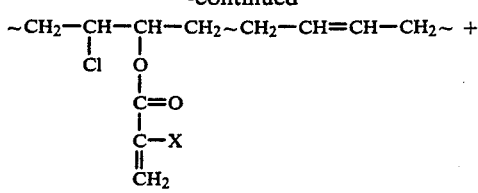

(CH₃)₃COH

The unsaturated carboxylic acids used herein include acrylic acid (X=H) and methacrylic acid (X=CH₃), with the methacrylic acid being preferred. The rate of modification is not particularly limited although modification is preferably effected such that the ratio of moles of the unsaturated carboxylic acid to moles of the butadiene unit may range from 1/500 to 1/20,000, more preferably from 1/2,000 to 1/15,000 in the modified rubber.

A polymer having a polymerizable side chain and a molecular weight of at least 500 as disclosed in U.S. Pat. No. 4,591,618 is suitable as the modified rubber used herein. The polymer is obtained by reacting a material having a carbon-to-carbon unsaturated double bond and a molecular weight of at least 500 with at least one of the polymerizable unsaturated monomers represented by the general formulas:

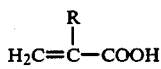 (I)

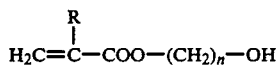 (II)

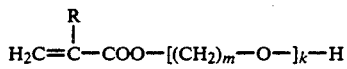 (III)

wherein R represents a hydrogen atom or methyl group, n is an integer selected from 2 to 5, m is an integer selected from 1 to 4, and k is an integer selected from 1 to 30, in the presence of an alkyl hypohalite or an N-haloamide compound represented by the general formula:

wherein X represents a halogen atom, A represents a carboxylic acid residue, sulfonic acid residue or carbonic acid monoester, and B represents a hydrogen atom, halogen atom or carboxylic acid residue.

The material having a carbon-to-carbon unsaturated double bond and a molecular weight of at least 500 may be selected from a wide range of materials having a carbon-to-carbon unsaturated double bond in their main or side chain and a molecular weight of at least 500. Examples of these materials include natural rubber, polyisoprene, polybutadiene, polychloroprene, butadiene-styrene copolymers, butadiene-acrylonitrile copolymers, butadiene-acrylic acid copolymers, butadiene-methacrylic acid copolymers, butadiene-methyl acrylate copolymers, butadiene-methyl methacrylate copolymers, butadiene-vinyl pyridine-styrene copolymers, ethylene-propylene-cyclopentadiene copolymers, ethylene-propylene-5-ethylidene-2-norbornene copolymers, ethylene-propylene-1,4-hexadiene copolymers, isobutylene-isoprene copolymers, halogenated or highly unsaturated derivatives of isobutylene-isoprene copolymers, and norbornene ring-opened polymers, alone and mixtures thereof.

When the material having a carbon-to-carbon unsaturated double bond and a molecular weight of at least 500 is reacted with an organic acid represented by the general formula:

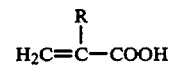

wherein R represents a hydrogen atom or methyl group, in the presence of the above-mentioned alkyl hypohalite or N-haloamide, for example, the reaction proceeds according to the following scheme.

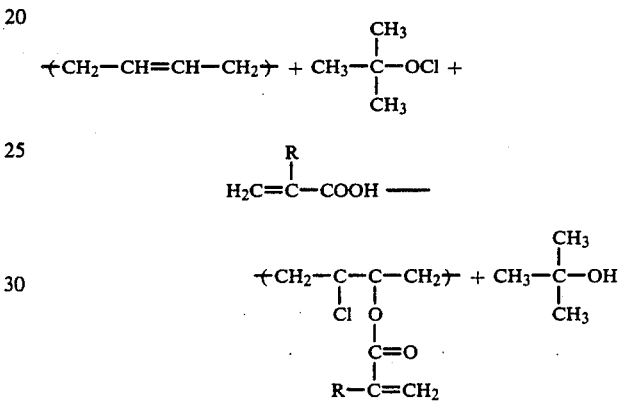

The introduction of such a side chain as an acryloyloxy or methacryloyloxy group is effected such that the organic acid of the general formulas (I) to (III) or an alcohol derived therefrom may be present in an amount of 1/100 to 1/5000 molar equivalent based on the weight of the material having a carbon-to-carbon unsaturated double bond and a molecular weight of at least 500.

In preparing a polymer in which the polymerizable side chain such as a methacryloyloxy or acryloyloxy group is present in an amount of 1/100 to 1/5000 molar equivalent per unit weight of the material having a carbon-to-carbon unsaturated double bond and a molecular weight of at least 500, that is, a polymer in which the material having a carbon-to-carbon unsaturated double bond and a molecular weight of at least 500 has a rate of modification of 1/100 to 1/5000, the reaction may be carried out by adding the polymerizable unsaturated monomer in a predetermined amount meeting the above-specified molar equivalent range. Alternatively, the desired modification rate may be reached by adjusting the amount of the alkyl hypohalite or N-haloamide used.

The reaction is often carried out in a solution system in which the material having a molecular weight of at least 500 is dissolved in a suitable solvent. Even when the material is solid, the reaction may be carried out while mechanically kneading the material under high shearing forces.

Examples of the organic acids of formulas (I) to (III) and their derivatives include acrylic acid, methacrylic acid, 2-hydroxethyl acrylate, 2-hydroxyethyl methacrylate, and other monoesters such as polyethylene glycol acrylate, polyethylene glycol methacrylate, and polytetramethylene glycol methacrylate.

According to the present invention, a one-piece ball or a core of a multi-layered ball is formed from a rubber composition containing the modified rubber as a base rubber component. The rubber composition may have blended therein a co-crosslinking agent, a free radical releasing agent (co-crosslinking initiator), a filler and other additives in addition to the modified rubber. Preferred examples of the co-crosslinking agent include unsaturated carboxylic acids and metal salts thereof, such as acrylic acid, methacrylic acid, maleic acid, fumaric acid, and metal salts thereof, e.g., Zn, Na, K, Ca, and Al salts, with zinc acrylate being most preferred. The co-crosslinking agent may be blended in amounts of about 10 to about 50 parts by weight per 100 parts by weight of the base rubber component.

Preferred examples of the free radical releasing agent or co-crosslinking initiator include organic peroxides, such as dicumyl peroxide, 1,1-bis(tert-butylperoxy)-3,3,5-trimethylcyclohexane, n-butyl-4,4-bis(t-butylperoxy)-valerate, 2,2'-bis(t-butylperoxy-isopropyl)benzene, and 2,5-dimethyl-2,5-di(t-butylperoxy)hexene. It may be blended in amounts of about 0.5 to about 5 parts by weight per 100 parts by weight of the base rubber component. A mixture of two or more free radical releasing agents having different reactivity may be used to enhance co-crosslinking.

Preferred examples of the filler include metal oxides such as zinc oxide and magnesium oxide. It may be blended in amounts of about 10 to about 80 parts by weight per 100 parts by weight of the base rubber component. If desired, the rubber composition can additionally contain a plasticizer, an antioxidant, and any other additives which are generally employed in the preparation of one-piece balls or cores of multi-layered balls.

The golf ball of the invention may be prepared by molding the above-formulated rubber composition as formulated above into a desired spherical shape, that is, a ball in the case of a one-piece ball or a core in the case of a multi-layered ball and vulcanizing the rubber by heating. The manufacture may be in accord with conventional method and conditions.

When multi-layered golf balls such as two-piece balls and thread-wound balls are manufactured, the core is coated with a cover. The cover material used herein may be selected from commonly used cover materials, for example, ionomers such as Surlyn®, polyesters, and nylons. The cover usually has a thickness of 0.5 to 2.5 mm.

The present invention may be applied to any type of golf ball including small balls having a diameter of at least 41.15 mm and a weight of up to 45.92 g, and large balls having a diameter of at least 42.67 mm and a weight of up to 45.92 g.

The distribution and total number of dimples are not critical although 300 to 550 dimples, preferably 350 to 540 dimples are generally formed on a ball. Preferred dimple arrangements are regular icosahedral, regular dodecahedral, and regular octahedral arrangements. The dimples is preferably distributed uniformly on the ball surface in such an arrangement.

The golf balls of the invention are characterized by high hardness, improved impact resistance, and improved durability.

EXAMPLE

Examples of the invention are given below together with comparative examples by way of illustration and not by way of limitation. Prior to the examples, the preparation of a base rubber or modified rubber to be blended in a rubber composition from which a golf ball is formed according to the invention is described together with a comparison of physical properties between the present rubber composition having the modified rubber blended and a comparative rubber composition having a conventional or unmodified rubber blended. In the examples, t-BHC is t-butyl hypochlorite and MAA is methacrylic acid.

PREPARATION 1

Polybutadiene (trade name BR-01, manufactured by Nihon Synthetic Rubber K. K.), 100 grams, was dissolved in 1 liter of toluene, to which solution was added 2.87 grams (0.033 mol) of methacrylic acid. With stirring, a solution of 3.62 grams (0.033 mol) of t-butyl hypochlorite, which was equimolar to the methacrylic acid, in 10 grams of toluene was added dropwise to the mixture at room temperature through a dropping funnel for reaction to slowly take place.

At the end of addition, the yellow color due to t-butyl hypochlorite disappeared within several minutes. After stirring was continued for a further 30 minutes, the reaction mixture was poured into a large volume of methanol, from which a polymer precipitated. The polymer was collected and dried. A sample was taken from the polymer product, dissolved in toluene, and analyzed for infrared absorption spectrum. The IR spectroscopy showed absorption peaks at $-1710$ cm$^{-1}$ attributable to a carbonyl group and 1160 cm$^{-1}$ attributable to an ester group (C—O—CO—), indicating that the polybutadiene was modified with methacrylic acid. This polybutadiene is designated "modified polybutadiene A." Modified polybutadiene A had a rate of modification of 1/3000.

Figure 3:
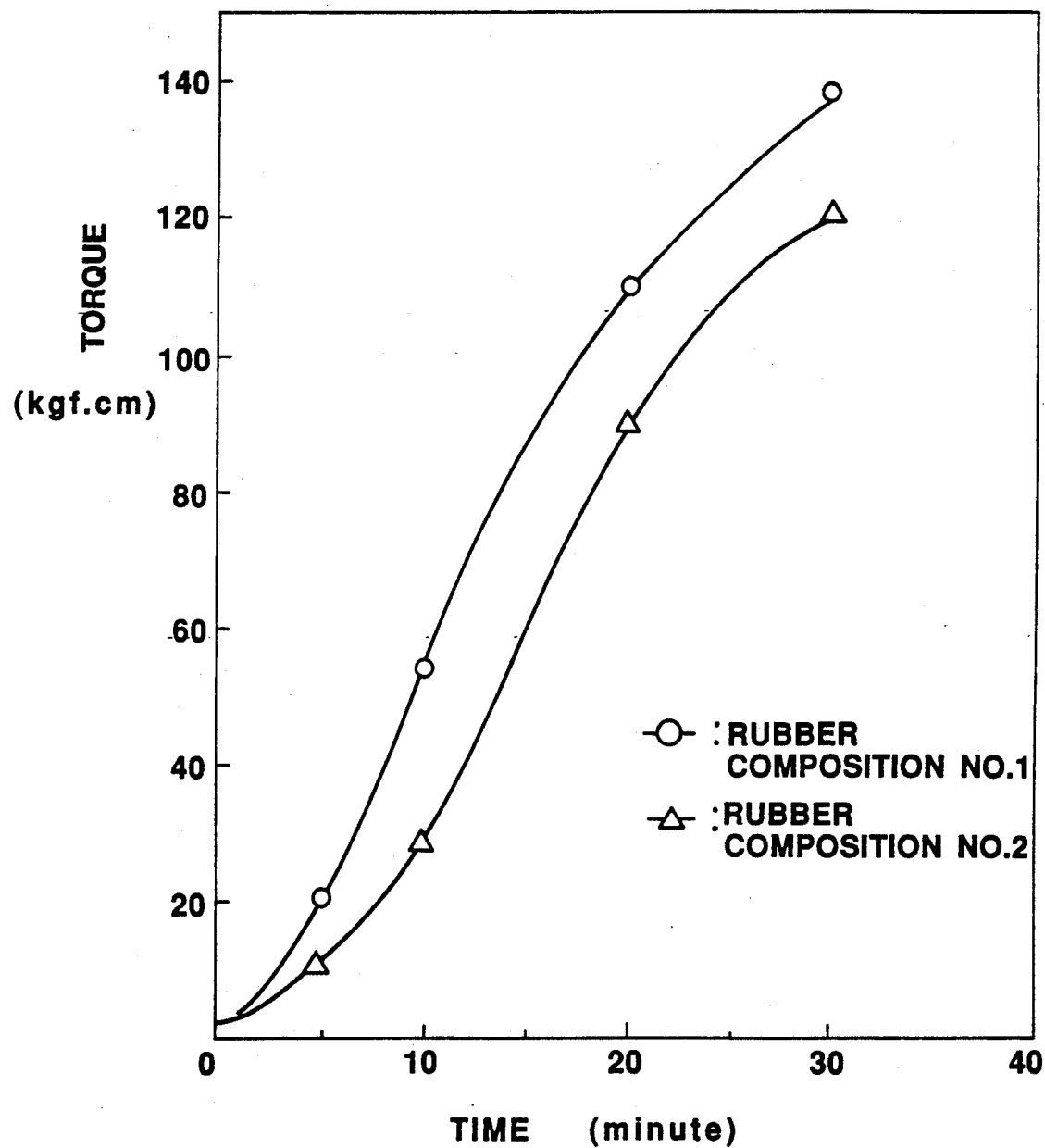
FIG. 3 is a diagram showing the crosslinking behavior of rubber composition Nos. 1 and 2 used in Preparation 1.

Rubber composition No. 1 was obtained by using modified polybutadiene A as a base polymer and milling the components shown in Table 1 in a small-size kneader at 70° C. for 5 minutes. Rubber composition No. 1 was measured for cross-linking behavior using a curelastometer (manufactured by Nihon Synthetic Rubber K. K.) at 140° C. The results are shown in FIG. 3. Rubber composition No. 1 was heat pressed for cross-linking reaction at a temperature of 40° C. and a pressure of 50 kg for 30 minutes, obtaining sheet specimens of 1 mm thick for physical measurement and specimens for modulus of elasticity measurement. These specimens were subjected to tensile tests to measure modulus of elasticity, breaking strength, elongation at break, and impact resilience. The measurement of elasticity, breaking strength, and elongation is in accord with JIS K 6301, and the measurement of resilience is in accord with British Standard No. 903. The rubber hadness was measured according to JIS K 6301 and expressed in JIS C hardness scale. The results are shown in Table 1.

For comparison purposes, rubber composition No. 2 having the same formulation as rubber composition No. 1 except that the base rubber component was an unmodified polybutadiene was prepared and similarly tested by molding similar specimens. The results are shown in the figure and Table 1.

TABLE 1

| Composition (parts by weight) | Rubber Composition | |
|---|---|---|
| | No. 1 | No. 2 |
| Modified polybutadiene A | 100 | — |
| Unmodified polybutadiene | — | 100 |
| Zinc acrylate | 30 | 30 |
| Zinc oxide | 10 | 10 |
| Antioxidant* | 0.2 | 0.2 |
| Dicumyl peroxide | 1.0 | 1.0 |
| Physical properties | | |
| Rubber hardness | 92 | 87 |
| 50% modulus of elasticity, kg/cm$^2$ | 95 | 59 |
| Breaking strength, kg/cm$^2$ | 115 | 80 |
| Elongation at break, % | 70 | 80 |
| Resilience, % | 84 | 82 |

*2,2',-methylenebis(4-methyl-6-t-butylphenol)

As seen from the data of Table 1, the hardness, tensile properties, and impact resilience of a rubber composition are improved by using as the base rubber component a modified polybutadiene prepared by introducing an unsaturated carboxylate group into a polybutadiene.

As seen from the curves of FIG. 3, rubber composition No. 1 required about 15 minutes of milling until a torque of 100 kgf. cm was reached while rubber composition No. 2 required about 20 minutes. This means that the use of a polybutadiene having a methacryloxy group offers a higher vulcanizing rate and hence, enhanced reactivity.

PREPARATION 2

Using a small-size kneader, 100 grams of polybutadiene was masticated at a temperature of 25° C., to which 4.30 grams (0.05 mol) of methacrylic acid was added dropwise. To a uniform mixture was slowly added 3.62 grams (0.033 mol) of t-butyl hypochlorite. The mixture was uniformly milled for reaction, obtaining modified polybutadiene B having a rate of modification of 1/3000. After modified polybutadiene B was allowed to stand at room temperature for one day, a sample was taken therefrom, dissolved in toluene, and analyzed for infrared absorption spectrum. The IR spectroscopy showed absorption peaks at 1710 cm$^{-1}$ attributable to a carbonyl group and 1160 cm$^{-1}$ attributable to an ester group.

Similarly, modified polybutadiene C have a rate of modification of 1/6000 was prepared by reacting 100 grams of polybutadiene with 2.15 grams (0.025 mol) of methacrylic acid and 1.81 grams (0.017 mol) of t-butyl hypochlorite.

Similarly, modified polybutadiene D having a rate of modification of 1/12000 was prepared by reacting 100 grams of polybutadiene with 1.08 grams (0.013 mol) of methacrylic acid and 0.91 grams (0.009 mol) of t-butyl hypochlorite.

Rubber composition Nos. 3, 4, and 5 were obtained by using modified polybutadienes B, C, and D as a base polymer and milling the components shown in Table 2 in a small-size kneader at 70° C. for 5 minutes.

Rubber composition Nos. 3, 4, and 5 were subjected to the same test as done for rubber composition Nos. 1 and 2. The results are also shown in Table 2.

TABLE 2

| Composition (parts by weight) | Rubber Composition | | |
|---|---|---|---|
| | No. 3 | No. 4 | No. 5 |
| Modified polybutadiene B | 100 | — | — |
| Modified polybutadiene C | — | 100 | — |
| Modified polybutadiene D | — | — | 100 |

TABLE 2-continued

| Composition (parts by weight) | Rubber Composition | | |
|---|---|---|---|
| | No. 3 | No. 4 | No. 5 |
| Zinc acrylate | 30 | 30 | 30 |
| Zinc oxide | 10 | 10 | 10 |
| Antioxidant* | 0.2 | 0.2 | 0.2 |
| Dicumyl peroxide | 1.0 | 1.0 | 1.0 |
| Physical properties | | | |
| Rubber hardness | 92 | 92 | 89 |
| 50% modulus of elasticity, kg/cm$^2$ | 93 | 92 | 70 |
| Breaking strength, kg/cm$^2$ | 112 | 115 | 110 |
| Elongation at break, % | 70 | 75 | 90 |
| Impact resilience, % | 84.0 | 83.0 | 83.0 |

*2,2',-methylenebis(4-methyl-6-t-butylphenol)

As seen from the data of Table 2, a bulk reaction due to the use of a mixer commonly used in the rubber industry is advantageously used as means for introducing an unsaturated carboxylate group into polybutadiene so that there is readily obtained a modified polymer. As to the rate of introduction of an unsaturated carboxylate group, introduction of one group per the polybutadiene molecular weight range of from 500 to 20,000, preferably from 2,000 to 15,000 is effective in improving physical properties of a rubber composition containing the modified polybutadiene.

EXAMPLES 1–4

Three types of cis-1,4 polybutadiene containing methacryloxy group, which are designated modified polybutadienes E, F, and G, were prepared by mixing the components shown in Table 3 for reaction. The modifying reaction was a bult reaction due to the use of a 3" cold roll mill.

TABLE 3

| | Modified polybutadiene | | |
|---|---|---|---|
| | E | F | G |
| Composition (grams) | | | |
| Polybutadiene BR-01 | 100 | 100 | 100 |
| t-BHC | 3.62 | 1.81 | 0.91 |
| MAA | 4.30 | 2.15 | 1.08 |
| Parameters | | | |
| Rate of Modification | 1/3000 | 1/6000 | 1/12000 |
| MAA/t-BHC molar ratio | 1.5 | 1.5 | 1.5 |

These modified polybutadienes E, F, and G were allowed to stand at room temperature for 24 hours. Rubber compositions were prepared by blending modified polybutadienes E, F, and G with the remaining components shown in Table 4. The rubber compositions were measured for physical properties by the same tests as previously used. The results are also shown in Table 4.

Next, one-piece solid golf balls having a diameter of 41 mm were prepared by heat molding the rubber compositions for 30 minutes in a mold at 143° C. The balls were tested for hardness, durability, and initial speed. The hardness was a deflection (mm) of a ball under a load of 100 kg. The durability was the number of hits until the ball was broken when it was hit in a hitting machine of the flywheel type at a head speed of 38 m/sec. The initial speed was measured by hitting the ball in the hitting machine at a head speed of 41.5 m/sec.

For comparison purposes, a one-piece solid golf ball (Example 4) was prepared from a similar rubber composition containing an unmodified cis-1,4 polybutadiene and tested for the same properties.

The results are shown in Table 4.

TABLE 4

|  | Ex 1 | Ex 2 | Ex 3 | Ex 4* |
| --- | --- | --- | --- | --- |
| Rubber Composition (pbw) | | | | |
| Modified polybutadiene E | 100 | — | — | — |
| Modified polybutadiene F | — | 100 | — | — |
| Modified polybutadiene G | — | — | 100 | — |
| Unmodified polybutadiene | — | — | — | 100 |
| Zinc acrylate | 32 | 32 | 32 | 32 |
| Dicumyl peroxide | 0.8 | 0.8 | 0.8 | 0.8 |
| Antioxidant** | 0.2 | 0.2 | 0.2 | 0.2 |
| Zinc oxide | 20 | 20 | 20 | 20 |
| Physical properties of rubber composition | | | | |
| Rubber hardness | 92 | 92 | 86 | 87 |
| 50% modulus, kg/cm$^2$ | 92 | 92 | 60 | 59 |
| Breaking strength, kg/cm$^2$ | 107 | 111 | 97 | 80 |
| Elongation at break, % | 65 | 70 | 90 | 80 |
| Impact resilience at 27° C., % | 83.5 | 82.3 | 81.9 | 82.2 |
| Ball performance | | | | |
| Hardness, mm | 2.16 | 2.75 | 2.80 | 3.00 |
| Durability | 110 | 107 | 105 | 100 |
| Initial speed, m/sec. | 73.5 | 73.3 | 73.2 | 72.9 |

*outside the scope of the invention
**2,2'-methylenebis(4-methyl-6-t-butylphenol)

As is evident from Table 4, the golf balls of the present invention exhibit improved flying performance, hardness and durability. The rubber compositions used in Examples 1-3 required about 15 minutes of milling until a torque of 100 kgf.cm was reached while the rubber composition used in Example 4 required about 20 minutes. This means that the use of a polybutadiene having a methacryloxy group offers a higher vulcanizing rate and hence, enhanced reactivity.

EXAMPLES 5-7

A rubber composition was prepared by blending modified polybutadiene E having a rate of modification of 1/3000 (see Example 1) with the remaining components shown in Table 5. A core was prepared by heat molding the rubber composition for 20 minutes in a mold at 145° C. The core was coated with a cover whose composition and parameters are shown in Table 5, obtaining a two-piece golf ball.

The ball was tested for initial speed and durability. The initial speed was measured by hitting the ball in a hitting machine of the flywheel type at a head speed of 41.5 m/sec. The durability was the number of hits until the ball was broken when it was hit in the hitting machine at a head speed of 38 m/sec.

For comparison purposes, two-piece golf balls (Examples 6 and 7) were similarly prepared by milling rubber compositions containing an unmodified polybutadiene, heat molding the rubber composition into cores, and applying covers to the cores. The balls were subjected to the same tests as above.

The results are also shown in Table 5.

TABLE 5

|  | Ex 5 | Ex 6* | Ex 7* |
| --- | --- | --- | --- |
| Core Composition (pbw) | | | |
| Modified polybutadiene E | 100 | — | — |
| Unmodified polybutadiene | — | 100 | 100 |
| Zinc acrylate | 35 | 35 | 40 |
| Zinc oxide | 19 | 19 | 17 |
| Antioxidant | 0.1 | 0.1 | 0.1 |
| Dicumyl peroxide | 1.0 | 1.0 | 1.0 |
| Core parameters | | | |
| Core diameter, mm | 38.0 | 38.0 | 38.0 |
| Core weight, gram | 34.0 | 34.0 | 34.0 |
| Core hardness** | 2.5 | 3.0 | 2.5 |
| Cover | | | |
| Surlyn | 100 | 100 | 100 |
| Titanium dioxide | 3 | 3 | 3 |
| Cover thickness, mm | 2.3 | 2.3 | 2.3 |
| Cover hardness, Shore D | 65 | 65 | 65 |
| Ball performance | | | |
| Initial speed, m/sec. | 73.0 | 72.5 | 72.7 |
| Durability | 110 | 100 | 95 |

*outside the scope of the invention
**a deflection (mm) under a load of 100 kg

As is evident from Table 5, the golf balls of the present invention exhibit improved flying performance (initial speed) and durability.

Although some preferred embodiments have been described, many modifications and variations may be made thereto in the light of the above teachings. It is therefore to be understood that within the scope of the appended claims, the invention may be practiced otherwise than as specifically described.

We claim:

1. A one-piece or core of a multi-layered golf ball comprising a rubber composition comprising a modified diene rubber, said diene rubber being selected from the group consisting of polybutadiene rubbers, natural rubbers, and polyisoprene rubbers, and said modified diene rubber including a group having the formula:

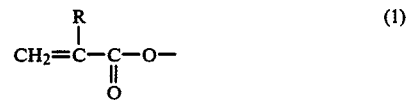

wherein R is hydrogen or an alkyl radical having 1 to 5 carbon atoms, wherein the group of formula (1) is present in an amount of about 1/500 to about 1/20,000 molar equivalent per unit weight of said diene rubber, about 10 to about 50 parts by weight of a co-crosslinking agent, about 0.5 to about 5 parts by weight of a free radical releasing agent, and about 10 to about 80 parts by weight of a filler per 100 parts by weight of the base rubber component.

2. The golf ball of claim 1 which is a one-piece golf ball, said ball being formed from said rubber composition.

3. The golf ball of claim 1 which is a multi-layered golf ball having a core coated with a cover material with or without an intermediate layer, said core being formed from said rubber composition.

4. The golf ball of claim 1 wherein the diene rubber is a polybutadiene rubber.

5. The golf ball of claim 4, wherein group of formula (1) is present in an amount of 1/2,000 to 1/15,000 molar equivalent per unit weight of said diene rubber.

6. The golf ball of claim 1, wherein the modified diene rubber has a molecular weight of at least 500.